Nov. 18, 1958     A. R. HENDRY     2,860,440
BUOYANT FISH LURE
Filed April 25, 1955

INVENTOR.
ADOLPH R. HENDRY
BY
Cook and Schermerhorn
ATTORNEYS

United States Patent Office 2,860,440
Patented Nov. 18, 1958

2,860,440

BUOYANT FISH LURE

Adolph R. Hendry, Portland, Oreg.

Application April 25, 1955, Serial No. 503,375

2 Claims. (Cl. 43—42.3)

This invention relates to improvements in fish lures and to a method of making the same. While the invention is illustrated and described herein as a fish lure, it is not to be limited thereto, as important features of the construction may be utilized for forming other hollow molded articles, such as fish net floats, buoys, ornaments, toys and the like.

Important objects of the invention are to provide a buoyant article of improved structure comprising a hollow body portion having a central tubular insert or bushing extending therethrough for sealing end openings therein and for receiving various rigging or parts to be connected to said body portion, and to provide a method for assembling said body portion and said insert.

A further object is to provide a buoyant article in the form of a fish lure which has flexible appendages adapted to wiggle in the water.

A further object is to provide a fish lure of molded rubber having the appearance of an egg cluster and a movement in the water simulating a live tadpole.

These objects are accomplished by a molded rubber article having a hollow interior and end openings for receiving and securing therein an elongated bushing. The bushing is tubular in shape for receiving a wire shank adapted to provide an attachment for hooks, spinners, or other parts which may form a part of a lure or support. Assembly of the central bushing is accomplished by a novel method utilizing a tool in the form of a channel-shaped needle of a size to receive the bushing. When made as a fish lure the article has a body portion contoured to resemble a cluster of fish eggs with a pair of trailing flexible appendages resembling egg strings which are capable of a frog leg movement in the water.

The invention will be better understood and additional objects and advantages will become apparent from the following description taken in connection with the accompanying drawings which illustrate a preferred form of the invention. It is to be understood, however, that the invention may take other forms, and that all such modifications and variations within the scope of the appended claims which will occur to persons skilled in the art are included in the invention.

The present lure is preferably molded from a flexible red rubber or plastic material and comprises, in general, a body portion 10 and divergent leg portions 11. Body portion 10 has a beaded surface defined by a plurality of semi-spherical projections to simulate a cluster of salmon eggs and the leg portions 11 comprise individual spherical balls 12 interconnected by rubber neck portions 13, the neck portions 13 being quite flexible to permit the leg portions 11 to wiggle or oscillate when the lure is trolled in the water or is anchored and water current flows thereby. The lure could, therefore, resemble an insect or small animal in the water, aside from its general appearance as a salmon egg cluster.

Figures 2, 3:
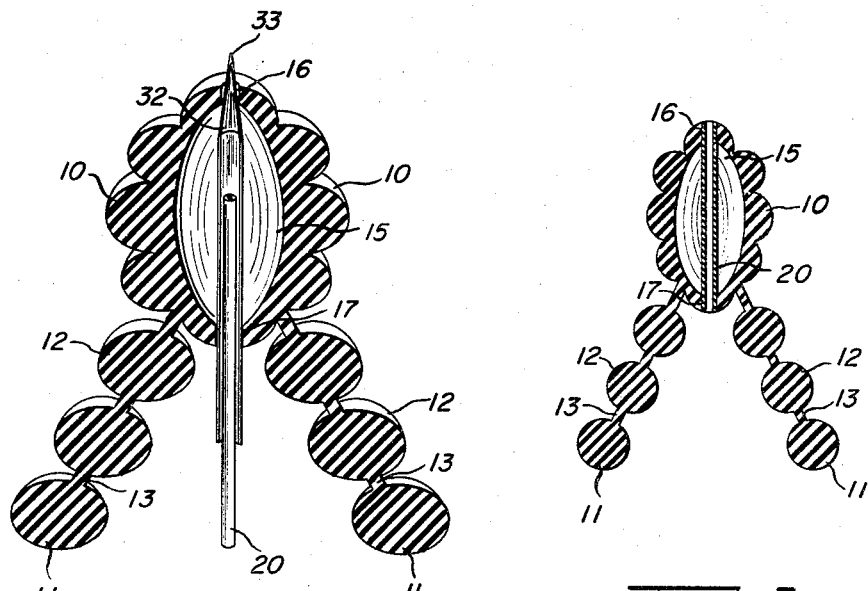
Figure 2 is an enlarged longitudinal sectional view in perspective, taken centrally of the lure to show the structure thereof, and also showing the tool for inserting the bushing in the body portion of the lure.
Figure 3 is a longitudinal sectional view of the lure showing the bushing secured in place.

Body portion 10 has a hollow interior 15 and has end openings 16 and 17 communicating therewith. As seen in Figure 3, a bushing or insert 20 in the form of an elongated tube is mounted in the end openings 16 and 17 and is of a sufficient size to form a tight seal in these openings. Tube 20 is of larger diameter than the openings 16 and 17 whereby the openings are expanded by the tube causing the walls of the openings to be compressed against the tube in secure rubber to rubber frictional engagement. By such structure, the interior of the body portion 10 is water-tight and the lure will have sufficient buoyancy to support a metal spinner and hooks and will not settle to the bottom of a body of water when in use. Bushing 20 is preferably rubber or plastic tubing, or the like, and is preferably adhesively secured in the end openings 16 and 17 by rubber cement.

Figure 1:
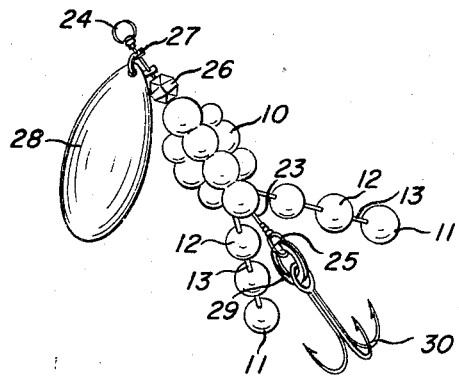
Figure 1 is a perspective view of a fish lure embodying the principles of the present invention.

Figure 1 shows a completed fish lure. A wire shank 23 passes through the interior of bushing 20 and has loops 24 and 25 on the ends thereof. Loop 24 is adapted to receive a fishing line and is separated from the body portion 10 by a bead 26 and a yoke 27. Yoke 27 is rotatable on the shank 23 and carries a spoon 28. At the opposite end of the lure is a split ring 29 and a fishhook 30. The shank 23 has free movement in the bushing 20 and there is thus provided a structure which permits free movement of the parts, and, at the same time, maintains a waterproof interior for the body portion.

To mount the bushing 20 in the body portion as shown in Figure 3, a preferred method is to use a tool 32, Figure 2. The tool 32 is channel-shaped in form and is of a slightly larger diameter than the bushing 20 so that the bushing may be carried therein. The tool 32 is sharpened at one end 33 and is open on one side for receiving the bushing. The purpose of the tool is to expand the openings 16 and 17 and to deposit the bushing 20 in said openings whereby when the tool is withdrawn the openings contract and engage the bushing. To perform this operation the bushing 20 is first coated with adhesive and laid in the trough of the tool and then the tool is pushed through the body portion from either end, expanding the openings 16 and 17 as it moves therethrough. When the bushing has been inserted through both openings 16 and 17, the protruding leading end of the bushing is grasped in one hand and the tool is withdrawn by the other hand, allowing the openings to contract and grip the bushing. The protruding ends of the bushing may then be cut off and the remainder of the fishing lure parts then assembled.

The structure thus disclosed comprises a lure which is unsinkable owing to the sealed air pocket therein and which is extremely durable because of the toughness of the rubber or plastic used. The lure resembles either a cluster of salmon eggs or an insect or small animal in the water for attracting the fish which may be feeding. The lure may be coated with a bright surface covering of red paint for further attracting the fish, and a still further attraction may be accomplished by mixing an aromatic or scenting substance, such as licorice, with the molding material which forms the lure.

When the lure is pulled through the water, the divergent trailing leg portions are deflected toward each other, and when the forward motion ceases the legs again swing out as shown. Thus, if the lure is pulled with an intermittent or jerky motion, the legs realistically simulate a frog kick which provides a strong attraction for nearby fish in quest of a tender morsel. The same kicking motion may be produced by alternately tensioning and slacking the line in moving water.

When a sinker is used on the line some distance ahead of the lure, in stream fishing, the lure and hook will drift downstream from the grounded sinker and tend to rise above the stream bottom where irregularities in the current will cause the leg portions of the lure to wiggle and kick at some distance beneath the surface of the water, depending upon the weight of the sinker, the buoyancy of the lure and hook, the length of leader between the sinker and lure, and the stream velocity and turbulence.

The body portion 10, due to its buoyant structure, may be used as a float for other purposes, such as for supporting a fish net. The bushing 20 is similarly mounted in the body portion and may receive therethrough the supporting rope of the net. The body portion is not subject to marine action or electrolysis in salt water, and is, therefore, substantially permanent in nature.

Having now described my invention and in what manner the same may be used, what I claim as new and desire to protect by Letters Patent is:

1. A fish lure comprising a hollow rubber body having aligned openings in opposite ends thereof, a tube extending through said body and sealed in said openings, said body having a semi-spherically beaded surface to simulate a cluster of fish eggs, and a pair of divergent legs extending from one end of said body and integral therewith, each leg comprising a series of spherical rubber beads interconnected with each other and with said body by slender flexible necks of rubber to simulate a string of eggs capable of free oscillating movement when the lure is pulled through the water.

2. A fish lure comprising a body portion having a semi-spherically beaded exterior surface to simulate a cluster of fish eggs, and a pair of divergent leg portions extending from the trailing end of said body portion, each leg portion comprising a series of spaced apart spherical beads interconnected with each other and with said body by slender, flexible necks, the spacing of said beads providing extensive freedom for bending in all directions to simulate a string of fish eggs, said two leg portions having free oscillating and bending movements to also simulate a frog leg kick when the lure is pulled through the water with a jerky movement, said body, bead and neck portions being all one piece of flexible rubber.

References Cited in the file of this patent

UNITED STATES PATENTS

| | | |
|---|---|---|
| 127,218 | Brown et al. | May 28, 1872 |
| 825,232 | Mitchell | July 3, 1906 |
| 1,062,626 | Wiedrich | May 27, 1913 |
| 1,362,308 | Heaton | Dec. 14, 1920 |
| 1,485,643 | Streich | Mar. 4, 1924 |
| 1,508,111 | Meyer | Sept. 9, 1924 |
| 1,635,518 | Welch | July 12, 1927 |
| 1,881,947 | Rawdon | Oct. 11, 1932 |
| 1,929,152 | Reichard | Oct. 3, 1933 |
| 2,290,433 | Jeffers | July 21, 1942 |
| 2,491,846 | Boekenoogen | Dec. 20, 1949 |
| 2,611,205 | Steel | Sept. 23, 1952 |